United States Patent
Kuhlmann et al.

(10) Patent No.: US 7,741,806 B2
(45) Date of Patent: Jun. 22, 2010

(54) MAGNETICALLY ATTACHABLE BATTERY RECHARGING

(75) Inventors: Kurt Kuhlmann, San Jose, CA (US); Dan R. Matthews, Gilbert, AZ (US)

(73) Assignee: Meridian Design, Inc., Cardiff, CA (US)

( * ) Notice: Subject to any disclaimer, the term of this patent is extended or adjusted under 35 U.S.C. 154(b) by 420 days.

(21) Appl. No.: 11/467,514

(22) Filed: Aug. 25, 2006

(65) Prior Publication Data

US 2008/0048609 A1 Feb. 28, 2008

(51) Int. Cl.
*H02J 7/00* (2006.01)

(52) U.S. Cl. .................. 320/107; 320/110; 320/112; 320/104; 320/114; 439/38; 439/39; 439/40

(58) Field of Classification Search ................ 320/110, 320/162; 439/38, 39, 40
See application file for complete search history.

(56) References Cited

U.S. PATENT DOCUMENTS

| | | | |
|---|---|---|---|
| 3,512,116 A | 5/1970 | Ichiro, et al. | |
| 3,750,083 A | 7/1973 | Fayling | |
| 3,786,391 A | 1/1974 | Mathauser | |
| 3,810,258 A | 5/1974 | Mathauser | |
| 4,377,003 A | 3/1983 | Abe et al. | |
| 4,384,752 A | 5/1983 | Gabriel | |
| 4,390,232 A | 6/1983 | Jamgotchian | |
| 4,609,238 A | 9/1986 | Jamgotchian | |
| 4,917,612 A | 4/1990 | Priest | |
| 5,004,425 A | 4/1991 | Hee | |
| 5,779,487 A | 7/1998 | Gatin | |
| 5,909,100 A * | 6/1999 | Watanabe et al. | 320/108 |
| 5,931,683 A | 8/1999 | Pinel | |
| 5,941,729 A * | 8/1999 | Sri-Jayantha | 439/505 |
| 6,007,363 A * | 12/1999 | Renk | 439/378 |
| 6,030,229 A | 2/2000 | Tsutsui | |
| 6,231,349 B1 | 5/2001 | Bullinger et al. | |
| 6,528,746 B2 | 3/2003 | DeWitt et al. | |
| 6,875,035 B2 | 4/2005 | Sakiyama | |
| 7,026,789 B2 | 4/2006 | Bozzone et al. | |
| 7,351,066 B2 * | 4/2008 | DiFonzo et al. | 439/39 |
| 2002/0089307 A1* | 7/2002 | Yang | 320/116 |
| 2006/0033476 A1* | 2/2006 | Reynolds et al. | 320/141 |
| 2006/0244421 A1* | 11/2006 | Narendran et al. | 320/132 |
| 2007/0072443 A1 | 3/2007 | Rohrbach et al. | |

FOREIGN PATENT DOCUMENTS

| | | |
|---|---|---|
| GB | 2414603 | 11/2005 |
| JP | 11027868 | 1/1999 |
| JP | 2002237354 | 8/2002 |
| JP | 2003036933 | 2/2003 |
| JP | 2003249317 | 9/2003 |
| WO | WO 0150140 | 7/2001 |
| WO | WO 2004095647 | 11/2004 |

* cited by examiner

*Primary Examiner*—Edward Tso
*Assistant Examiner*—Ramy Ramadan
(74) *Attorney, Agent, or Firm*—Zarian Midgley & Johnson PLLC

(57) ABSTRACT

A charging device for transferring electrical charge between a variety of sources and clients comprising charging circuitry and electrical leads with magnetically attaching connectors is disclosed. The magnetically attachable leads are used to connect to external batteries or other sources or clients. The charging circuitry may be a buck, boost, or boost/buck switching ASIC or may be a micro-controller.

19 Claims, 4 Drawing Sheets

MAGNETICALLY ATTACHABLE BATTERY RECHARGING

TECHNICAL FIELD

The present disclosure relates to the recharging of rechargeable batteries, and more particularly to circuitry and magnetically attachable leads for connecting to any battery for battery recharging.

BACKGROUND OF THE INVENTION

With continued miniaturization of electronic components the range of portable devices continues to grow yearly. Media players for music and video are becoming common place, measurement devices such as laser measurement tools are becoming less expensive and common enough to find in retails stores, and devices that previously had been embodied in low technology, such as flashlights, are becoming highly complex devices with computer chips controlling bright white LED lamps allowing selection of brightness and higher power efficiency. This wide range of devices have widely differing power requirements and this has yielded a wide array of batteries to meet the needs of these portable devices.

One major difficulty with the advent of so many portable devices is the need to maintain their batteries. In many cases the batteries are simply removed and replaced with new batteries and the old ones discarded. This can be wasteful of resources as more devices require batteries and more batteries are disposed. Rechargeable batteries reduce the waste but require special battery chargers as the differing chemistries and sizes for the various kinds of batteries require different methods and connection methods for recharge. Therefore users with many portable devices often need several chargers; perhaps one for a mobile phone, another for a PDA (Portable Digital Assistant), another for a digital camera and yet another for a portable music or video player. Otherwise the user must carry replacement batteries for each portable device. Typically each of these devices uses a different battery due to their differing size and power requirements.

There are three well known methods of connecting to a battery under use or recharge. The first common method is by way of a metal tab or leaf spring. These can be seen in common portable devices where a bent metal tab presses against the battery when it is placed into its compartment. A second method, which is similar in application to the leaf spring contact, is the spiral spring contact. Again these are common in electronic devices where a battery is placed into a physical compartment and one or both ends are pressed against a spring for its electrical and physical contact to the rest of the circuit. In many cases a leaf spring and a spiral spring are used together. The leaf contacts the positive bump at one end of a standard battery and the spiral spring contacts the flat negative end at the other. This combination offers a certain amount of polarity protection helping to prevent the user from putting the battery in backwards and possibly damaging the device. In both of these previously noted cases the batteries are often not charged within the device. This is especially true when the batteries are of a standard size, such as A, AA, C or D since several chemistries exist for the same size of battery each requiring a different method of monitoring charge completion. Using the wrong method to charge a battery can cause damage to the battery which in turn can damage the device itself, possibly through leakage or even combustion of the battery.

The third common method applied is a contact pad and bent pin. This method is very common in mobile phones and devices where the battery is seldom if ever removed. When this method is employed the battery typically has a gold plated contact pad and the device typically has a gold plated bent pin contact. The battery is typically held against its contact by some form of spring latch or battery cover panel. In these cases the battery is of a known type, with its chemistry and charging needs known by the manufacturer and therefore its charging needs can be met quite easily by a dedicated internal or external charging circuit. For rechargeable devices that are intended to be used and charged repeatedly, this pin and pad method of connection is most common and a dedicated battery type is almost always used. In all of the above cases the compartment is sized for a specific battery type.

In some so called "universal battery chargers" a chamber that is long enough to accept the largest target battery is used and a spring loaded contact holds the smallest target battery in place but can be levered into place to receive the largest acceptable battery size.

In some few cases the battery may have a metal plate or magnet affixed to it so that it can be held into place with a magnet. This method is common in rechargeable phones where the phone and or cradle has a magnet and the phone, when rested in the cradle, comes into contact with charging pads that can then recharge the handset.

In all of the above stated examples the power is supplied from an external adapter that is plugged into an AC wall outlet. The supply is normally a DC power adapter for portable electronic devices, commonly called a "wall wart". The voltage supplied by the power adapter is fixed such that it meets the device's needs precisely for charging the battery. Internal circuitry, such as a buck or boost converter may be employed if the input voltage needs to be converted to a different value to match the needs of charging the battery.

Some designs employ magnets to improve electrical connectors, but rarely does the magnet itself make the electrical contact. For instance relays employ a magnet or electromagnetic device to pull a movable spring contact onto a fixed contact to close a circuit. Other similar devices move a rocker contact into position, telephone cross-bar switches once worked in this way. Examples of magnetically movable contacts in the prior art are U.S. Pat. Nos. 5,931,683 and 3,750,083 as well as British patent GB2414603.

Another common example of magnets employed for making electrical connections involves building a magnet into one or both sides of a connector pair, such that the connectors are attracted and make a stronger or better aligned connection. Examples of this include U.S. Pat. Nos. 3,786,391, 3,810,258, 4,917,612, 5,779,487, 6,030,229, 6,231,349, 6,528,746, and 6,875,035; Japanese patent applications JP2002-237354, JP2003-036933, JP2003-249317; and Japanese patent JP11027868.

A few items in the prior art connect to batteries, but are special quick disconnect devices, also in two parts requiring one half of the pair to be affixed to the battery, typically a vehicle battery, and the other end is attached to a cable end. Examples of this include U.S. Pat. Nos. 4,609,238 and 4,390,232.

Another example of magnets used to make quick disconnect possible include the U.S. patent for connecting a safety grounding strap, U.S. Pat. No. 5,004,425, "Magnetic Snap Assembly for Connecting Grounding Cord to Electrically Conductive Body Band" and the international patent application WO2004-095647A1 "Safety Wire Connector" which shows how to connect two wires together that can be quickly disconnected.

One category of methods for using magnets is to make electrical test connectors for examining circuits and electronic devices. British patent GB1181111, which corresponds with U.S. Pat. No. 3,512,116 shows a method of attaching leads via magnets to female connections on circuit boards. International patent WO0150140 "Test connector" offers "improved connectivity due to magnetization of tip" and U.S. Pat. No. 4,377,003 "Testing Device for Electronic Circuits" which is intended "Especially for Portable Radios" shows a method of tapping power off of the battery from the device under test to power the testing circuit with a fixture that includes a magnet for the electrical connection. A method of developing experimental circuits is discussed in U.S. Pat. No. 4,384,752 "Hook-up wires with magnetic connectors" where a post and socket combination are required to make the electrical connections.

Finally a number of patents cover aligning a battery or holding the battery or device in place while it is being charged but do not contact the battery terminals themselves. Examples of this include U.S. Pat. No. 6,007,363 "Magnetically Latchable Device for Electrically Coupling a Power Source to a Circuit" and U.S. Pat. No. 7,026,789 "Charging System for Electronic Devices" where in both cases a battery is mounted on the battery or in the cradle where the battery will be laid into for charging to assist in holding the battery in place or aligning it properly. In these cases the battery also acts to trigger a sensor that it is present.

What is lacking in all of the previously discussed patents and prior art is the ability to magnetically connect to a battery to facilitate charging it, and most especially making a universal lead that can be quickly attached and detached to a variety of batteries or charging sources for the purposes of giving or taking a charge to or from the battery without recourse to special connector pairs and custom fixtures. Furthermore none of the above mentioned inventions discuss using such a magnetically attachable lead for the purposes of charging small batteries for portable devices, nor do they teach adding such a feature to a portable device to enable it to extract a charge from an external battery.

SUMMARY OF THE INVENTION

An easy to use method of charging a battery for a portable device, which can optionally include extracting that power from another battery or other power source, is disclosed. The user may choose from a wide variety of source or target batteries or other power sources. The disclosed leads also make connecting to the source or target battery as easy as possible. Preferably, one or more wire leads with magnetic connectors at the end are used to connect to an external battery whether acting as a power source or destination. The disclosed methods and devices may be a component of any device with an internal rechargeable power storage device or it may be embodied in a recharger capable of recharging internal or external rechargeable power storage devices. Furthermore, the disclosed methods and devices may use a wide variety of AC or DC power source including, but not limited to, batteries, AC power outlets, vehicle power outlets (i.e., cigarette lighter type outlets), and photo-voltaic solar panel.

BRIEF DESCRIPTION OF THE DRAWINGS

The features and advantages of the present invention will be discussed in detail in the following description, and in conjunction with the accompanying drawings.

DETAILED DESCRIPTION OF THE INVENTION

Figure 1:
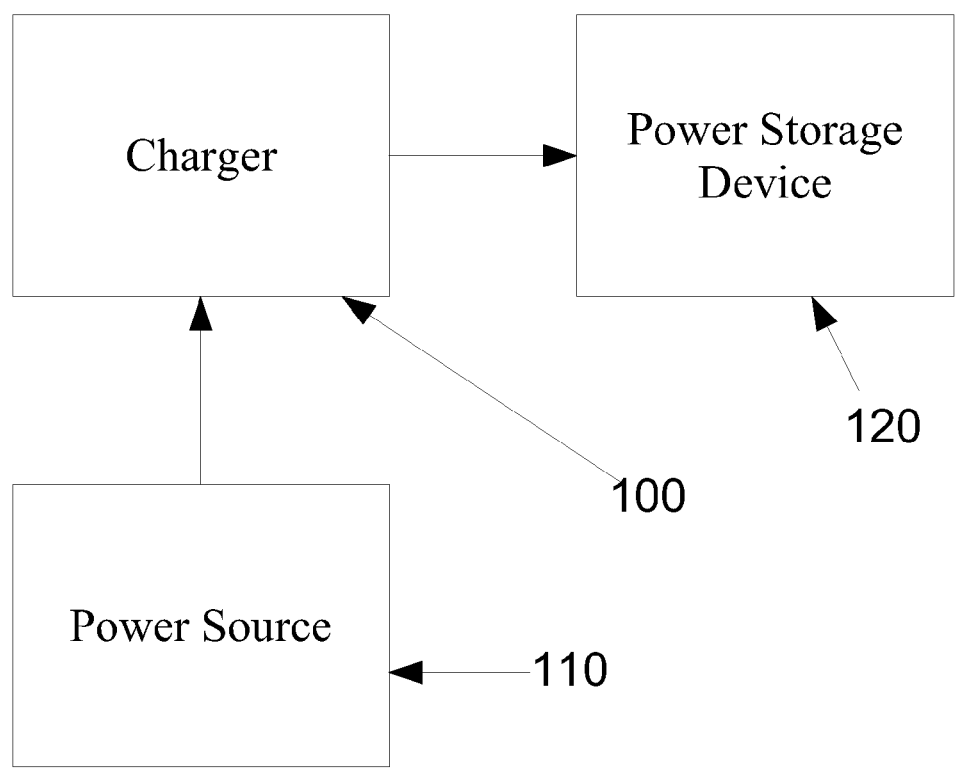
FIG. 1 is a block diagram illustrating the disclosed method of transferring electrical charge from a source to an external storage device.

A device for transferring charge from a source to a client storage device 120 (hereinafter referred to as the "client") is disclosed. The transfer circuitry is such that the source 110 and client 120 may be of different voltages or currents. Charge may be transferred from a higher voltage source 110 to a lower voltage client 120, from a lower voltage source 110 to a higher voltage client 120, or between a source 110 and client 120 of the same voltage. The source 110 may be an AC or a DC current. A preferred embodiment utilizes a custom boost, buck, or boost/buck switching Application Specific Integrated Circuit ("ASIC") or a micro-controller with associated circuitry to transfer charges at differing voltages.

In a preferred embodiment, charge is transferred to or from external battery 111 via magnetic leads 101 comprising wires 103 with conducting magnetically attaching ends 102. Alternatively, one or more wires 103 may be omitted with the magnetic connection point directly attached to the device 130. In another alternative embodiment, wires 101 may have magnetically attaching ends 102 at both ends of wire 101 rather than being fixedly attached to the device 130 at one end.

The magnetic leads 101 may attach to a variety of batteries, including but not limited to standard AAA, AA, C, or D batteries and lithium or NiMH-based cells, as the vast majority of such batteries are encased with magnetic iron-based materials. Preferably, the circuitry is able to detect the proper voltage for the source 110 and the client 120. In less preferred embodiments, the user may indicate the type of source 110, client 120, or both. Alternatively, some embodiments may be designed for a specific source 110, client 120, or both. Once the source 110 and client 120 are detected or identified, the boost, buck, or boost/buck circuitry is used to step up or step down the voltage from the source 110 to match the client 120.

The magnetic leads 101 may be polarized such that each must be properly aligned with the positive or negative ends of the battery. Alternatively, the configuration of the internal circuitry is such that the device will function properly with either magnetic lead 101 attached to either end of the battery. If the magnetic leads 101 are polarized, they will preferably be marked in some manner, such as with colors or with symbols, to indicate polarity. Such marking may be on the magnetic connectors 102 or at some other point on the wire 103 or device.

The strong magnetic connection between the lead and the source provides other advantages. This connection allows for good current flow because of its low parasitic resistance. The tendency of the magnetic connector to rub on the source connection point also tends to keep the connection clean and maintain a relatively low resistance connection allowing more efficient charge transfer.

These magnets are preferentially but not necessarily plated with a solderable material like gold. The wires could be connected to the magnets with an electrically conductive epoxy, solder or the like. Alternately they may be soldered or crimped to a connector that is plated and that is designed to hold said magnets.

One preferred embodiment would utilize a micro-controller or ASIC that runs at a voltage between 3V to 5V DC. Batteries for portable devices are generally between 1.5V to 3V. This allows for a narrow purpose lower cost charging circuit. The charger 100 would only pull a charge from battery(s) 111 that are lower in voltage than the voltage the charger 100 is running at internally. This enables a simple inductive boost circuit to be employed where the input voltage is always inductively boosted to a higher charge voltage to be used in charging the internal battery 120. Inductive boosting can be accomplished by switching with a transistor a coil connected to the input source to ground and releasing it so that the higher voltage is created and captured on a capacitor through a series diode which is then used for charging the internal battery. Reverse polarity protection is provided by diode. Both ASICs and micro-controllers are capable of the voltage measurement, switching control, and regulation needed to convert input voltages to the needed charge voltage for this kind of switch boost topology.

Another advantage is that the control circuitry can be made to charge slowly which results in both less expensive (lower power rated) electrical parts and more efficient use of the source battery. Alkaline cells for instance have higher overall capacity if they are used at low current draw.

Another preferred embodiment would allow only for voltages that are higher than the running voltage of the charge circuit. In this case the input voltage is chopped and averaged to create a lower voltage. Chopping, or "bucking" as it is often known, can be achieved cheaply by switching the input voltage on and off through a series inductance in order to control the charging current to the system batteries.

In yet another embodiment where an even wider range of input voltage is desired that can be both higher or lower than the desired charge voltage a more sophisticated and somewhat more expensive approach can be taken where the input voltage is boosted if it is lower than the desired charge voltage or chopped or bucked if it is higher. Several Buck/Boost Converter ICs exist on the market that can accomplish this task. However it is likely that the device would already have intelligent control and therefore a micro-controller would already be embedded in the design. A fairly sophisticated buck/boost switching regulator can be realized in the same control design with the addition of the appropriate switching elements and coils. As these magnetic connections can be freely connected in either forward or reverse polarity to the input source it is useful to build in some form of reverse polarity protection either with circuit elements such as a diode block or bridge or FET block or bridge. The block method simply allows power to flow in only the forward direction and blocks power from flowing in the reverse direction. A bridge allows the power to be directed in the proper forward direction regardless of the polarity the battery is connected. Either method protects the charging circuit, but the bridge allows the user to connect the magnets in either polarity and the device can still charge properly.

Figure 2:
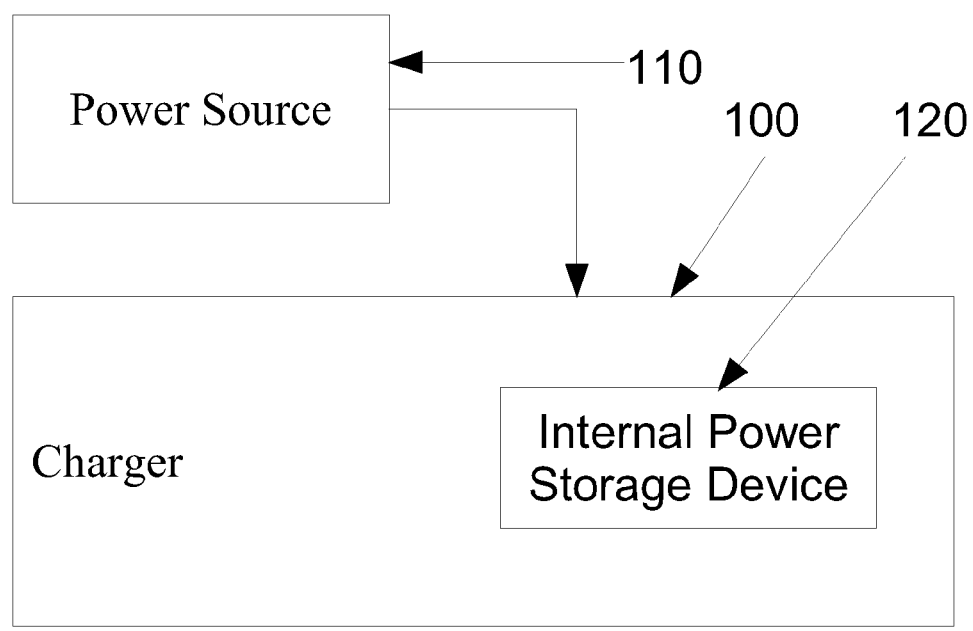
FIG. 2 is a block diagram illustrating the disclosed method of transferring electrical charge from a source to an internal storage device.

Referring to FIGS. 1 and 2 illustrate in block diagram form two basic embodiments of the disclosed recharge method. FIG. 1 illustrates transferring the charge from a source 110 to the disclosed charger 100. The charge is transferred from the charger 100 to the client storage device 120. These steps may take place simultaneously with no charge stored in the charger 100 or the charge may be transferred into some temporary storage device within the charger 100 for later transfer to the client.

FIG. 2 illustrates in block diagram form another basic embodiment where the client 120 is an internal component of the device 100, which may be removable such as with a rechargeable battery 111. The device may be a charger 100 or the charger 100 may be one sub-function of a device with a different primary purpose, such as a cellular phone that recharges its internal battery.

Figure 3:
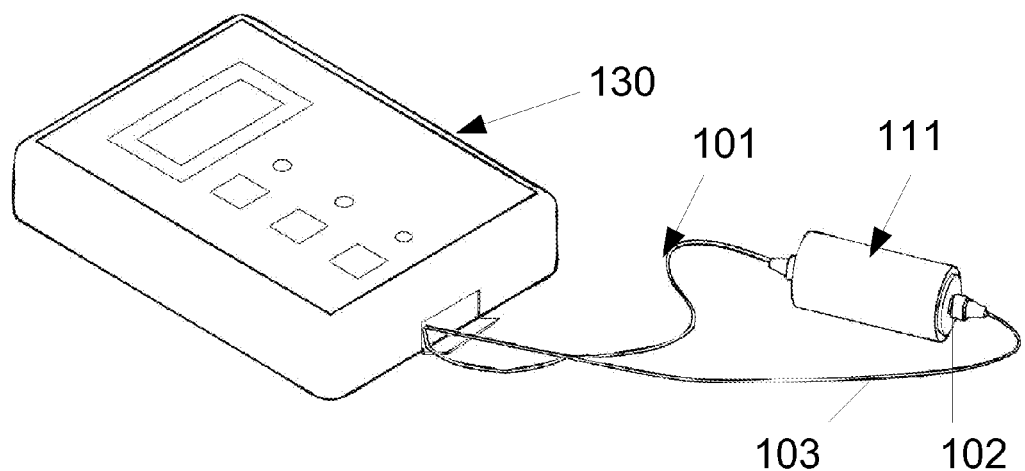
FIG. 3 is a perspective view of an electronic device transferring charge to or from an external battery.

FIG. 3 shows a generic portable electronic device 130. It may represent a dedicated charging device with one embodiment of the disclosed magnetic leads 101. The device 130 may draw charge from any external battery 111 and subsequently using it to charge another external battery using the same set of leads. It may also be seen as representing a generic portable electronic device powered by an internal rechargeable battery whose primary function(s) is other than charging the battery. The disclosed leads 101 are then used to recharge the internal battery from an external battery 111.

Figure 4:
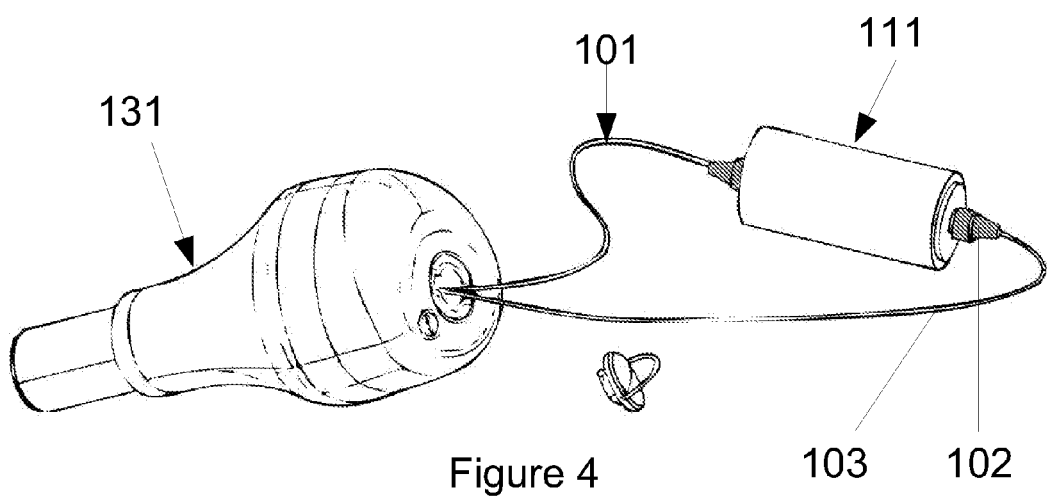
FIG. 4 is a perspective view of an electronic device transferring charge from an external battery to an internal battery or batteries.
Figure 5:
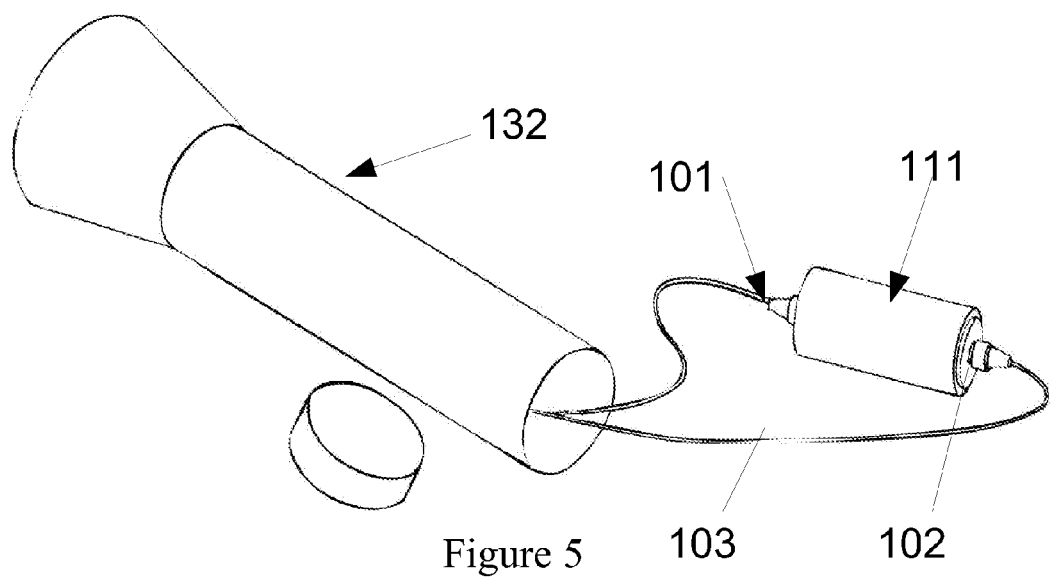
FIG. 5 is a perspective view of a flashlight transferring charge from an external battery to internal battery or batteries.
Figure 6:
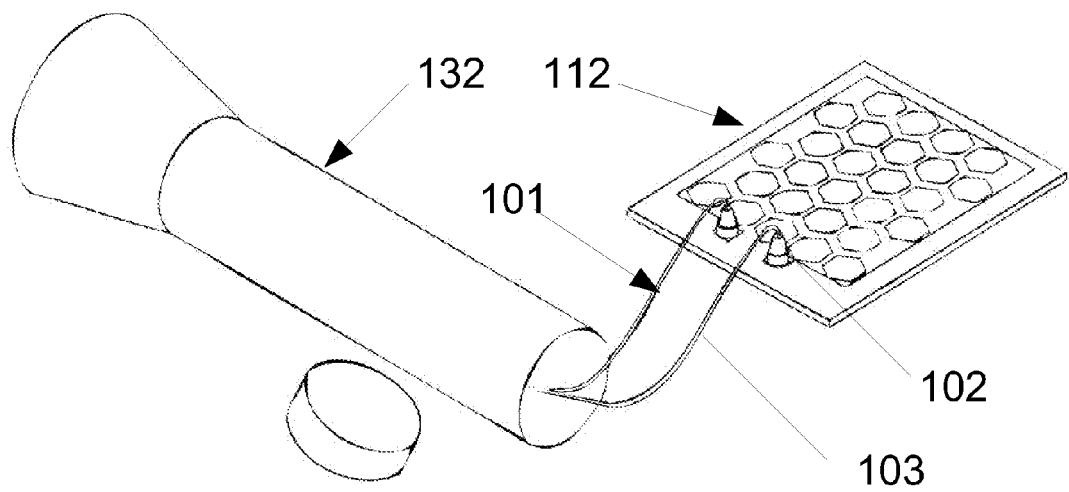
FIG. 6 is a perspective view of a flashlight transferring charge from a photo-voltaic solar panel to internal battery or batteries.

FIGS. 4, 5, and 6 illustrate a few examples of the many possible embodiments of the disclosed invention. FIG. 4 shows one electronic device 131 containing an embodiment of the disclosed apparatus including an internal charging circuit with magnetic leads used to recharge an internal rechargeable battery. FIGS. 5 and 6 illustrate a flashlight 132 with embodiments of the disclosed internal circuitry and magnetic leads. These figures illustrate the use of the disclosed system to recharge the flashlight's internal power supply from an external battery and from a photo-voltaic cell, respectively.

Figure 7:
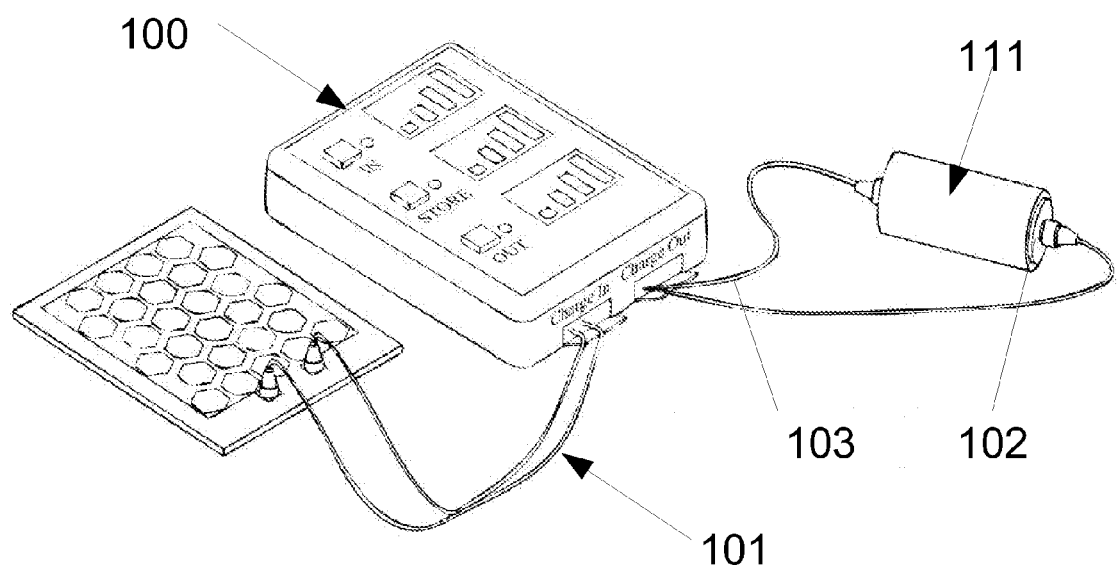
FIG. 7 is a perspective view of a device transferring charge from a photo-voltaic solar panel to an external rechargeable battery.

FIG. 7 illustrates another embodiment of the disclosed system. It shows a portable charge transfer device 133 being used to transfer power from a photo-voltaic cell 112 to an external battery 111 using two sets of magnetic leads 101. Devices with additional sets of leads for drawing from multiple sources or supplying to multiple clients may also be utilized and are within the scope of this patent.

It will be appreciated that, although specific embodiments of the invention have been described herein for purposes of illustration, various modifications may be made within the spirit and scope of the invention. An equivalent structure for those shown herein falls within the invention and the claims.

We claim:

1. A method of transferring electrical charge comprising:
   attaching a first magnetic connector directly to a first contact of a first source, said first magnetic connector being connected to a first flexible and exposed electrical lead;
   attaching a second magnetic connector directly to a second contact of said first source, said second magnetic connector being connected to a second flexible and exposed electrical lead;
   drawing charge from said first source through said first and second magnetic connectors, and a charging circuit; and
   sending said charge from said charging circuit to a first electrical charge storage device,
   wherein said first and second magnetic connectors comprise permanent magnets, and are capable of directly connecting to a second source and drawing charge from said second source, said second source having a different size or shape than said first source.

2. The method of claim 1 wherein said first source is a battery.

3. The method of claim 1 wherein said first source is a photo-voltaic cell.

4. The method of claim 1 wherein said first source is an AC current.

5. The method of claim 1 wherein said first source is a DC current.

6. The method of claim 1, further comprising;
detaching said first magnetic connector from said first contact of said first source,
detaching said second magnetic connector from said second contact of said first source,
attaching said first magnetic connector directly to a first contact of a second electric charge storage device,
attaching said second magnetic connector directly to a second contact of said second electric charge storage device, and
sending said charge from said first electrical charge storage device to said second electric charge storage device.

7. The method of claim 1 wherein said charging circuit is a buck circuit.

8. The method of claim 1 wherein said charging circuit is a boost/buck circuit.

9. The method of claim 1 wherein said first electrical charge storage device is a battery.

10. The method of claim 1 wherein said first electrical charge storage device is a capacitor.

11. The method of claim 1, further comprising;
detaching said first magnetic connector from said first contact of said source,
detaching said second magnetic connector from said second contact of said source,
attaching said first magnetic connector directly to a first contact of a second electric charge storage device,
attaching said second magnetic connector directly to a second contact of said second electric charge storage device, and sending said charge from said first electrical charge storage device to said second electric charge storage device.

12. The method of claim 1, further comprising powering a portable electronic device with said first electrical charge storage device.

13. The method of claim 1, further comprising;
attaching a third magnetic connector directly to a first contact of said first electrical charge storage device prior to sending said charge from said charging circuit to said first electrical charge storage device, said third magnetic connector being connected to a third electrical lead, and
attaching a fourth magnetic connector directly to a second contact of said first electrical charge storage device prior to sending said charge from said charging circuit to said first electrical charge storage device, said fourth magnetic connector being connected to a fourth electrical lead.

14. A method of transferring electrical charge comprising:
attaching a first magnetic connector directly to a first contact of a first source, the first magnetic connector being connected to a first flexible and exposed electrical lead;
attaching a second magnetic connector directly to a second contact of the first source, the second magnetic connector being connected to a second electrical lead;
drawing charge from the source through the first and second magnetic connectors, and a charging circuit; and
sending the charge from the charging circuit to a first electrical charge storage device,
wherein the first and second magnetic connectors comprise permanent magnets, and are capable of directly connecting to a second source and drawing charge from the second source, the second source having a different size or shape than the first source.

15. The method of claim 14, wherein the second electrical lead is flexible and exposed.

16. A charge transfer device comprising:
a housing;
a charging circuit positioned within the housing and configured to operatively connect to a plurality of different types of charge source, each of the plurality of different types of charge source comprising a first contact and a second contact;
a first electrical lead operatively connected to the charging circuit, the first electrical lead extending from the housing and being flexible;
a first magnetic connector comprising a permanent magnet, the first magnetic connector being operatively connected to the first electrical lead and being configured to directly connect to the first contact;
a second electrical lead operatively connected to the charging circuit;
a second magnetic connector comprising a permanent magnet, the second magnetic connector being operatively connected to the second electrical lead and being configured to directly connect to the second contact;
wherein the charging circuit is configured to operatively connect to an electrical charge storage device, and is configured to transfer charge from the plurality of different types of charge source, through the first and second magnetic connectors, to the electrical charge storage device, and
wherein the plurality of different types of charge source include types of charge source with different shapes or sizes.

17. The charge transfer device of claim 16, wherein the plurality of different types of source comprise a battery, a capacitor, a photo-voltaic cell.

18. The charge transfer device of claim 16, wherein the second electrical lead is flexible and extends from the housing.

19. The charge transfer device of claim 16, wherein the electrical charge storage device is operatively connected to the charging circuit though a third electrical lead and a fourth electrical lead and is positioned within the housing.

* * * * *